(12) United States Patent  
Rafeld

(10) Patent No.: US 6,401,828 B1
(45) Date of Patent: Jun. 11, 2002

(54) HORSESHOE-LIKE HOOF PAD OF PLASTIC MATERIAL

(75) Inventor: Karl Rafeld, Wildpolsried (DE)

(73) Assignee: CERA Handelsgesellschaft mbH (DE)

( * ) Notice: Subject to any disclaimer, the term of this patent is extended or adjusted under 35 U.S.C. 154(b) by 0 days.

(21) Appl. No.: 09/578,075

(22) Filed: May 23, 2000

(30) Foreign Application Priority Data

Dec. 2, 1999 (DE) ......................................... 299 21 225
Mar. 17, 2000 (DE) ......................................... 200 04 928

(51) Int. Cl.$^7$ ............................. A01L 7/00; A01L 5/00
(52) U.S. Cl. ............................................. 168/12; 168/4
(58) Field of Search ............................ 168/4, 6, 9, 12, 168/DIG. 1

(56) References Cited

U.S. PATENT DOCUMENTS 257,500 A * 5/1882 Layden ......................... 168/12
3,494,422 A * 2/1970 Clark ............................. 168/4

FOREIGN PATENT DOCUMENTS

GB 358446 * 4/1930 ................... 168/12
GB 340928 * 1/1931 ................... 168/4

* cited by examiner

Primary Examiner—Robert P. Swiatek
(74) Attorney, Agent, or Firm—Gifford, Krass, Groh, Sprinkle, Anderson & Citkowski, P.C.

(57) ABSTRACT

A horseshoe like hoof pad of plastic material having two legs, which can be adopted to the size of the hoof by means for changing their distance with respect to one another having the form of a connecting bar bridging these legs of the pad within the area of their ends and engaging the legs, which pad having a lower surface contacting the underground and an upper surface contacting the hoof, which lower surface is provided with profile elements. In order to improve the connection of the ends of the legs and especially to improve the transmission of forces over essentially the entire front faces of the ends of the legs as well as to improve the connecting bar in form of a snug fit piece adapted to different sized horseshoes the invention proposes to configure the connecting bar as a surface covering, separate, snug fit piece having a special circumference completing essentially the recesses within the ends of the legs if this piece is inserted into the ends with the effect that the legs of the hoof pad can be extended or contracted elastically in dependency of the size of the special configured snug fit piece keeping the legs in mounted condition of the piece under tension.

28 Claims, 2 Drawing Sheets

Figure 6:
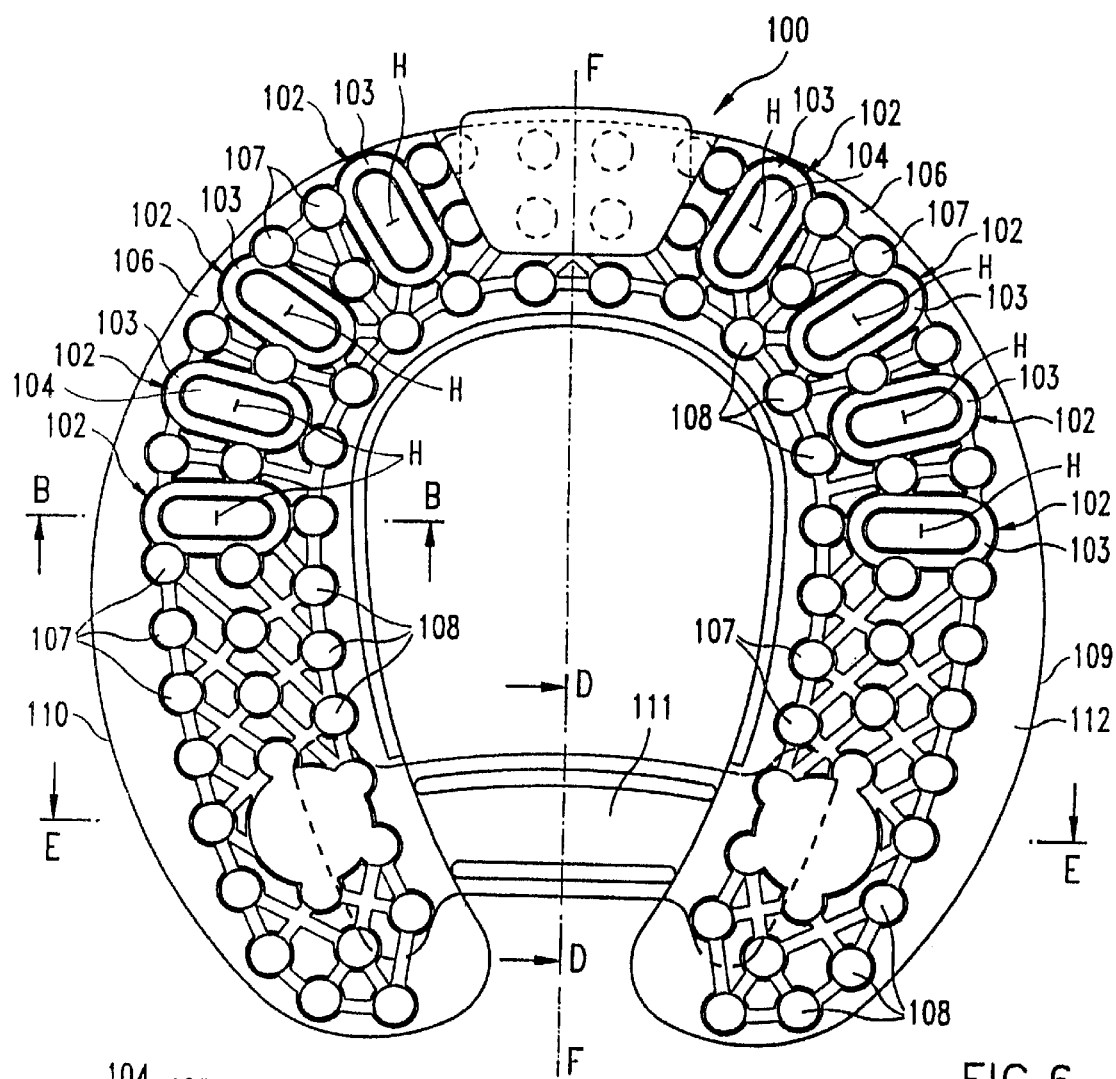

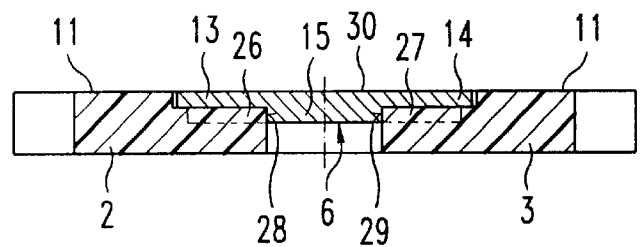
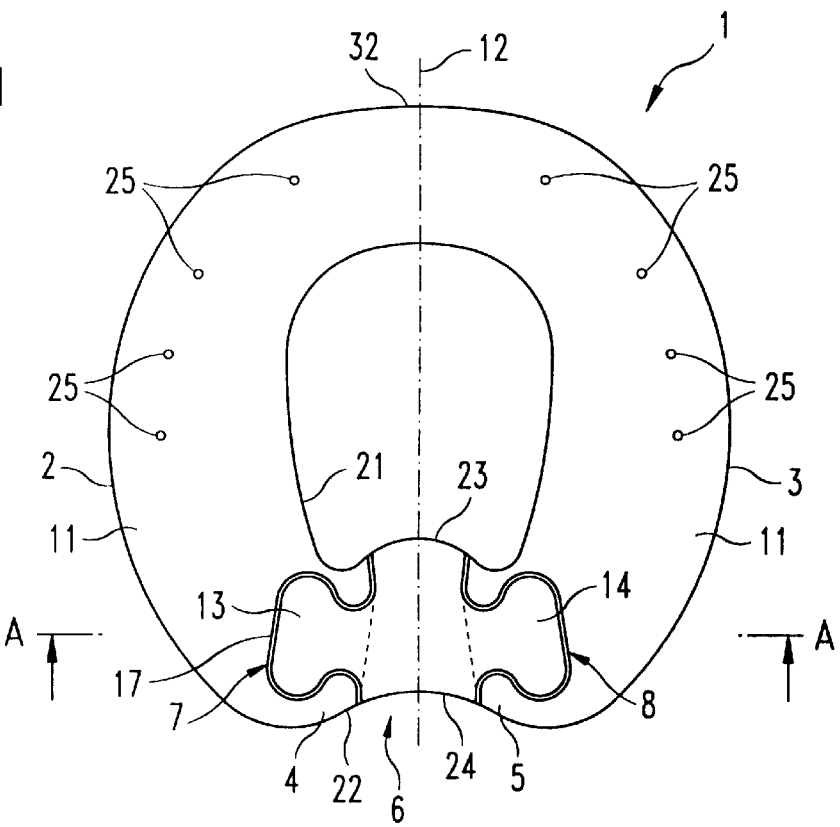
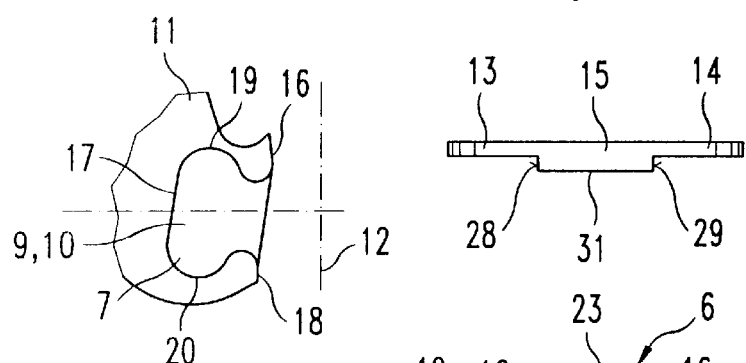
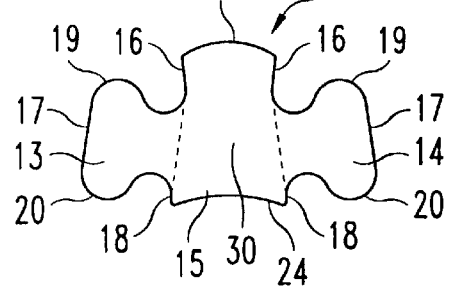

HORSESHOE-LIKE HOOF PAD OF PLASTIC MATERIAL

BACKGROUND OF THE INVENTION

The invention concerns a horseshoe-like hoof pad of plastic material having two legs, which can be adapted to the size of the hoof of horses by means for changing their distance with respect to one another having the form of a connecting bar bridging these legs of the pad within the area of their ends and engaging the legs, which pad having a lower surface contacting the underground and an upper surface contacting the hoof, which lower surface is provided with profile elements.

Such horseshoe-like hoof pads are known for instance from European patent No. 893,057 and U.S. Pat. No. 3,519,079. The known hoof pad of plastic material is open between its two legs which are thus separated with respect to one another within the spread portion of the hoof, the socalled frog portion. The hoof pad is provided with openings by which the pad is fixed with nails to the so called white line of the hoof.

The above mentioned known horseshoes are characterized especially by the feature that they can be adapted to different hoof sizes by spreading the legs of the pad in the area of their ends resulting therein that one size of pad are suited for different hoof sizes because the requested hoof pad size can be received by using plate like connecting bars between the ends of the legs spreading or contracting, respectively, these ends as the case may be so that the row of openings within the pad covers the respective white fine of the hoof for nailing the pad to the hoof. The known connecting means are characterized by different configurations, such for instance a clip having a free end, which is adjustable and can be connected to the opposite other leg end by screwing, gluing or welding. Moreover, bar elements are also proposed which are shiftable with respect to one another, bridging the distance between the ends of the legs of the hoof pad by means of connecting screws.

In each case the known bar like connecting means are structured such that they only connect the ends of the legs limiting the width of the spread legs of the hoof but do not form a homogeneous closure of the ends of the legs. Thus, the connecting means are either asymmetrically configured and arranged with respect to the longitudinal axis of the hoof pad, covering only one leg or in case of a symmetrical configuration and arrangement the connecting bars establish only a point-like connection between the two legs by means of screws fixing the bar or bars to the ends of the legs such that screw bars are necessary at the ends of the legs corresponding bores within the connecting bars receiving corresponding screws.

Moreover, hoof pads are known which are provided with a nap-like profile on the bottom surface of the pad comprising several naps connected to one another by the height of which is less than the height of the naps. This structure of the bottom surface of the hoof pad should be a bar against sliding of the horseshoe on the bottom.

It has been find out that the attachment of the hoof pad by means of nails known in the art requesting precise adjustment of the pad on the hoof so that the nails hit the so called white line of the hoof is a time consuming and rather complicated procedure because of the fact that the point of the nails often intend to move laterally upon hitting the nails with a hammer because of the flexibility of the plastic material of the pad so that the so-called white line is failed.

SUMMARY OF THE INVENTION

One of the objects of the subject invention is to improve the connection of the ends of the legs and especially to structure the ends such that the transfer of pressure forces will be possible over essentially the entire front surfaces of the ends of the legs by means of the bar like connecting body transmitting these forces of the pad introduced by the weight of the horse during the movement of the horse at a walking, trotting or galloping pace. Moreover, this bar like connecting body should simultaneously fulfil the object of an insert keeping the ends of the legs under tension in the requested distance with respect to one another.

A further object of the invention is to provide a connection or joining between the two legs of the horseshoe-like hoof pad forming a bar of a clover-leaf configuration having a thickness essentially similar to the thickness of the legs within the area of their ends and which can be inserted into respectively configured openings within those ends of the leg having the same configuration as said connecting bar. Furthermore, the connecting body could be structured such that it is more simply and less cost intensive to manufacture than the known devices of such a kind.

Moreover, the construction of the connecting bar should be such that several connecting bars of different sizes can be used for one and the same hoof pad in order to spread or contract the legs of the pad for adapting them to the size of the hoof of the horse without needing additional elements for securing or fastening the connecting bar at the pad.

A still further object to be solved by the invention is to provide the bottom surface of the hoof pad with profile bodies or elements so that the nails for attaching the hoof pad to the hoof can be more precisely guided during hammering home and especially the heads of the nails do not extend over the profile bodies.

In this connection, it is a further object to be solved to provide an improved adjustment of the hoof pad with respect to the arrangement of the nails within the hoof.

These and other objects are solved by the invention by providing the connecting bar between the ends of the legs of the hoof pad as a flat, separate, snug fit complementary piece completing essentially the circumferential configuration of the ends of the legs in order to join them, which piece being provided with lateral flat bars insertable into corresponding recesses in the surface of the ends of both legs such that these ends are maintained under tension.

According to a further embodiment of the invention, at least some of the profile bodies on the bottom surface of the hoof pad are configured as holes provided with elevations forming recesses into which nails can be placed so that their head is surrounded by an edge or wall.

By such a snug fit piece between the ends of the legs of the hoof pad these legs are maintained fixed and are spread under load in a less extend than in those cases which uses connecting means for the two leg ends only on one side of the pad or a curved narrow bar connecting the two leg ends. The snug fit piece according to the invention is in accordance with an advantageous embodiment provided with a configuration or shape being symmetrical to the longitudinal axis of the hoof pad and thus to the legs. This is in so far advantageous because this configuration counteracts the forces introduced into the legs of the hoof pad during the use thereof which forces intend to deform the leg ends. This counteraction is based on the fact that because of the special configuration of the circumference of the snug fit piece the retaining forces of that piece are transmitted into an essentially larger cross section of the leg end so that the connecting bar cannot brake under load as it does in prior art devices of such a kid. This is of essential importance, because the resistance against deformation of the plastic material under the influence of pressure and temperature is smaller than that one of iron as the usual material of horseshoes.

Moreover, the snug fit piece as the connecting element for the leg ends of the hoof pad can be relatively simply adapted to hoofs of different sizes and especially different positions of the so called white line of the hoof which is solely suited for the reception of fastening means, for instance nails or screws. The above structure of the hoof pad according to the invention has the advantage that a definite hoof pad size can be enlarged in the spreading or frog area of the hoof in a certain extend by means of different sized snug fit piece. Thus, it is possible to adapt one and the same hoof pad to different hoof sizes of the horse without using complicated adapting means.

In this connection it has been found out as especially advantageous to provide the snug fit piece of the connecting bar with two flat, lateral clover-leaflike wings and one centre piece connecting these two wings which wings correspond with respect to their configuration to recesses within the ends of the legs provided with circumferential lines or edges running inclined to the longitudinal axis of the hoof pad.

The above mentioned circumferential lines are advantageously comprised of three essentially straight parts and two S-configured, bent parts, joining the straight parts. Thus, the snug fit piece has a configuration similar to that one of a clover-leaf.

In accordance with a further advantageous embodiment of the subject invention a straight part of the circumferential line is provided at the inner circumference and the outer circumference of each leg end, both straight inner and outer parts are inclined and opposite to one another with respect to the longitudinal axis of the hoof pad. In this connection it is possible that a third straight part positioned between the straight inner part and the straight outer part of the circumferential line and joined through the two S-configured bent parts with the latter ones runs inclined to the longitudinal axis of the hoof pad in accordance with the straight outer part so that the snug fit piece corresponds to the edges of the leg ends surrounding that piece having a conical seat. By such a seat the spreading of the hoof pad within the spreading area of the hoof is improved and moreover it can be avoided that the snug fit piece slides out of that area. Attention is drawn especially to the fact that the construction of the hoof pad can be such that the outer circumference and the inner circumference of the leg ends are continued by the other circumferential line and, respectively, lower circumferential line of the snug fit piece so that the smug fit piece is a flat complementary piece of the leg ends. In case the leg ends are bent in the direction to the head portion of the hoof pad the upper circumferential line of the snug fit piece is bent convexly and the lower circumferential line is bent concavely and both lines are symmetrically arranged with respect to the longitudinal axis of the hoof pad.

In order to make the snug fit piece on the one hand concisely ending with the surface of the hoof pad, especially one of the leg ends, but on the other hand to provide for the snug fit piece within the leg ends a support avoiding sliding through, it has been found especially advantageous to provide the elevated centre part of the snug fit piece with an upper side opposite to the hoof pad surface being in the same level as the surface of the lateral wings and being concise with the surface of the leg ends. In this connection, the bottom side of the snug fit piece adjacent to the hoof pad surface can be stepped in order to form the elevated centre part, so that the two wings are separated from the thicker centre part caused by edges limiting an opening within the hoof pad and thus covering the opening edge surrounding the separated supporting faces of the leg ends.

Moreover, it has been found to be advantageous to adjust the hoof pad during the mounting on the surface of the hoof pad with respect to the white line of the hoof by shifting the hoof pad laterally so that the head of the nails can be counter sunk with certainty in the bottom surface of the hoof pad. In this connection the bottom of the respective recesses provided with a thickness less than the thickness of the pad, because the nail can then be better hit, as there is less plastic material to be removed by the nails.

In order to further improve the above mentioned advantage the bottom of the recess can be provided with at least one hole for the reception of the tip or the shaft, respectively of the nail. Moreover, to take for the edge of the recess or the hole, respectively, like elevations, the height thereof corresponds essentially to that one of the head of the nail, whereas the length of the hole-like recess is sized for the correct placing of the nail and should therefore correspond to at least the two fold length of the nail.

The above mentioned elevations formed by the edges surrounding the holes are advantageously configured as slots, positioned in the front area of the hoof pad so that during mounting thereof they are arranged on the so called white line into which the nails are hammered.

DETAILED DESCRIPTION OF THE INVENTION

The invention is described in the following on the basis of embodiments as shown schematically in the drawings in which.

Figure 9:
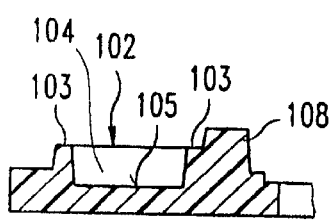
Figure 8:
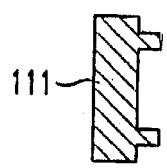
Figure 7:
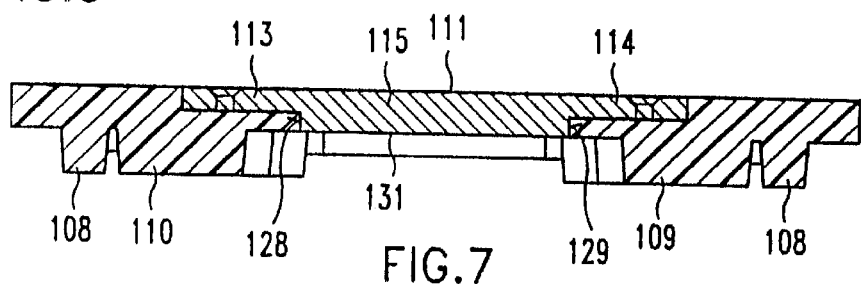

FIG. 1 is a plan view of the hoof pad of the subject invention provided with a mounted snug fit piece, FIG. 2 is a sectional view of the hoof pad of FIG. 1 along the line A—A, FIG. 3 is a plan view of the snug fit piece, FIG. 4 is a front view of the snug fit piece, FIG. 5 is a detailed plan view of the left leg end of the hoof pad of FIG. 1, FIG. 6 is a with respect to FIG. 1 enlarged plan view of the bottom face of the hoof pad in accordance with a further embodiment of the invention, FIG. 7 is a sectional view along the line E—E in FIG. 6, FIG. 8 is a sectional view of the snug fit piece forming the connecting bar within the area of the leg ends of the hoof pad along the line D—D in FIG. 6, and FIG. 9 is a sectional view of one of the two legs of the hoof pad of FIG. 6 along the line B—B.

The plate like hoof pad 1 shown in FIG. 1 is manufactured of plastic material and comprises basically the known horseshoe like configuration of the hoof pad provided in its bottom surface 11 with holes 25 which are used for fixing the pad by means of nails, screws and similar elements within the area of the so-called white line of the hoof. The hoof pad has two legs 2, 3, the ends 4, 5 thereof are provided within the spread area of the hoof surrounding the frog portion with recesses 7, 8 in form of flat, lateral, rounded spaces 9, 10 as shown in the detailed view of FIG. 5. A corresponding configured snug fit piece 6 forming the connecting bar between the legs 2, 3 is inserted into these recesses 9, 10 and is nearly completely integrated into the surface 11 of the ends of the legs in order to close this surface similar to a hoof pad closed per se.

The snug fit piece 6 connects the two leg ends 4, 5 such that the forms of recesses within the leg ends 4, 5 are completely filled by corresponding parts of that piece 6. The snug fit piece 6 is symmetrically configured with respect to the longitudinal axis of the hoof pad 1 as shown in FIGS. 3 and 4. It is provided with two flat lateral wings 13, 14 and an elevated centre portion 15 connecting the two wings. Both wings are integrated in the surface of the two leg ends, as shown in FIG. 1. The centre portion 15 is provided, as shown in FIGS. 2 and 4, with a lower side 31 opposite to the upper surface of the hoof as well as with an upper side 30 in the same level of the upper surface of the hoof, which upper side 30 is disposed in the same level as the wings 13, 14 and the corresponding lateral spaces 9, 10 and is concise after mounting the hoof pad, as especially shown in FIG. 2, with the upper surface 11 of the leg ends 4, 5.

For that purpose the lateral wings 13, 14 of the snug fit piece 6 are formed and arranged symmetrically to the longitudinal axis 12 of the hoof pad 1 and thus to the legs 2, 3 which are provided with correspondingly formed recesses 7, 8 in the ends of the legs provided with circumferential lines 16, 17, 18 inclined to the longitudinal axis 12 as shown in FIG. 5. Each circumferential line is provided with inner and outer straight parts 16, 18 at the inner circumference 21 and at the outer circumference 22 of each end 4, 5 of the legs, and these two inner and outer straight parts 16, 18 are inclined oppositely to the longitudinal axis 12 of the hoof pad. Between the straight inner part 16 and the straight outer part 18 there is a third straight part 17 of the circumferential line connected to both mentioned parts 16 and 18 by two S-configured bent parts 19, 20 of the circumferential fine, which parts are also inclined to the longitudinal axis of the hoof pad. The width of each wing 13, 14 measured vertically to the longitudinal axis 12 of the hoof pad corresponds generally to the width of the centre part 15 connecting the two wings.

As can be gathered from FIG. 1, the outer circumference 22 and the inner circumference 21 of the ends 4, 5 of the legs are continued by the upper circumferential line 23 and, respectively, lower circumferential line 24 of the snug fit piece 6, the ends 4, 5 of the legs being convexly and, respectively concavely, curved in the direction of the upper end 32 of the hoof pad and are with respect to the longitudinal axis 12 symmetrically configured.

Thus, the ends 4, 5 of the legs define an opening the edge thereof is configured such that it corresponds on the surface 11 of the legs to the outer circumference of the snug fit piece 6. On the lower side of the snug fit piece opposite to the surface 11 that opening is surrounding the borders 28, 29 of the elevated centre part 15 of the snug fit piece. That opening receiving the snug fit piece 6 is provided with stepped support faces 26, 27 for the reception of the wings 13, 14.

Thus, the snug fit piece 6 is provided between the ends 4, 5 of the legs with a seat having not only height imitation means in form of the support faces 26, 27 within the ends of the legs, but also a lateral limitation by means of the edges of the recesses 7, 8. Thus, the snug fit piece may be after its mounting either better welded with the ends of the legs or screwed with these ends or fixed to them otherwise. In case it is screwed the clover-leaf configured lateral wings 9, 10 supported by the support faces 26, 27 are connected to one another.

Moreover, it is possible, to provide the snug fit piece with detent elements to be inserted on mounting into correspondingly configured counter elements at the legs in order to receive the requested configuration of the hoof pad.

In order to summarize the above mentioned main features of the subject invention one can say that the special configuration of the snug fit piece 6 in form of a flat element provided with clover-leaf-like wings at both ends and used as connecting bar between the two legs 2, 3 of the hoof pad 1 needs no mechanical fastening elements with respect to the legs but is only fastened between the legs by configurational means in form of the above mentioned wings which are inserted into correspondingly configured recesses within the surface of the legs. Thus it is possible to extend the legs if a snug fit piece 6 of the corresponding size is inserted, and it is also possible to contract the legs by using a correspondingly smaller snug fit piece thus, one and the same hoof pad can be used for different sized horseshoes by using different sized snug fit pieces.

The plate like hoof pad 100 as shown in FIGS. 6 to 9 is also manufactured of plastic material and has two legs 109, 110 which are connected in the area of their ends by a connecting bar in the form of a separate snug fit piece 111 covering and completing the surface of the legs, which piece can be inserted into the ends of the legs and, if necessary, removed therefrom in order to be exchanged by a corresponding piece of another size. The lower surface 112 of the hoof pad which comes into contact with the earth or a road, if the horse is moving at a walking, trotting or galloping pace is provided with profile elements in form of elevations 102 provided with slots or holes as well as in form of naps 108. These elevations are formed by depressions 104 into which a hoof nail may be placed not shown in the drawings, and they are defined by an edge 103, the height of which corresponds in general to the height of the head of the nail. The bottom 105 of the depression is of a thickness which is less than that one of the hoof pad as shown in FIG. 9.

Within the bottom 105 at least one hole for the reception of the tip or the shaft, respectively of the nail is provided. This hole is not shown in the drawings. The length of the slot like elevation 102 or a correspondingly figured depression 104, respectively, corresponds at least to twice the head of the nail so that on mounting the hoof the hoof pad can be laterally adjusted with respect to the surface of the horse hoof, in order to cover the so-called white line H of the hoof with the depressions 104 in which the nails are hammered.

The edge 103 of the slot like elevation 102 is running continuously and these elevations are positioned in the front area of the pad such that during mounting the hoof pad they cover the white line H which is shown in FIG. 6 by a dotted line visible through the bottom 105 of each depression 104 in case as plastic material for the pad a transparent material is used.

As shown in FIG. 6, the elevations 102 in the front area of the pad 100 are arranged on both sides of the symmetry axis F—F in the same distances, and between them and beside them the bottom surface 106 of the hoof pad is provided with naps 107, 108 completing the profile elements, which naps can be similar or different configured and can be distantly arranged with respect to one another. In the sectional view of FIG. 7 two of these naps 108 are shown, and it can be realized that the naps have a conical cross section resulting in the fact that they are tapering in the direction to the bottom surface contacting the earth or road or similar underground so that soiling within the surface of the hoof pad can be removed easier.

What is claimed is:

1. Hoof pad comprising:

two legs being arranged symmetrically relative to each other and having an inner circumference wall and an outer circumference wall, each of said legs having an end defining a recess, an upper surface for contacting a hoof and a lower surface for contacting the ground, said lower surface having profile elements; and a snug fit piece adapted to connect the ends of the legs, said snug fit piece having two flat, lateral wings extending symmetrically from an elevated center part, said wings being insertable into said recesses defined in said ends of the legs such that the legs of the pad can be adapted to the size of a hoof as a result of the insertion of a larger snug fit piece that expands the legs or a small snug fit piece that contracts the legs.

2. The hoof pad according to claim 1, characterized in that the snug fit piece connects the ends of the legs by being precisely fitted therein in configurational and force transmitting aspects.

3. The hoof pad according to claim 1, characterized in that the snug fit piece is configured symmetrically to a longitudinal axis of the hoof pad.

4. The hoof pad according to claim 1, characterized in that the configuration of said recesses corresponds to the configuration of the wings and the recesses are provided with circumferential walls that are inclined with respect to a longitudinal axis of the hoof pad.

5. The hoof pad according to claim 4, characterized in that the circumferential walls of the recesses comprise three substantially straight walls joined by two S-configured curved walls.

6. The hoof pad according to claim 5, characterized in that a third straight wall is positioned between the straight inner wall and the straight outer wall and is connected to both the inner and outer wall by S-configured curved walls, said S-configured curved walls being inclined with respect to the longitudinal axis of the hoof pad.

7. The hoof pad according to claim 4, characterized in that one of said circumferential walls comprises a straight inner wall positioned at the inner circumference of the end of each leg and another one is a straight outer wall positioned at the outer circumference of the end of each leg, said straight inner wall and straight outer wall being arranged opposite and inclined with respect to the longitudinal axis of the hoof pad.

8. The hoof pad according to claim 4, characterized in that a width of each wing measured perpendicularly to the longitudinal axis of the hoof pad corresponds substantially to the width of the centre part.

9. The hoof pad according to claim 4, characterized in that said circumferential walls of said recesses form a clover-leaf configuration.

10. The hoof pad according to claim 1, characterized in that the ends of the legs are concavely curved in the direction of a front end of the hoof pad.

11. The hoof pad according to claim 1, characterized in that the outer circumference wall and the inner circumference wall of the ends of the legs are continued by an upper circumferential wall and a lower circumferential wall respectively of the snug fit piece.

12. The hoof pad according to claim 11, characterized in that the upper circumferential wall is convexly curved and the lower circumferential wall is concavely curved and said snug fit piece is symmetrically configured with respect to a longitudinal axis of the hoof pad.

13. The hoof pad according to claim 1, characterized in that the bottom side of the snug fit piece is stepped to form the elevated centre part.

14. The hoof pad according to claim 1, characterized in that the snug fit piece is fixed into at least one of the recesses of the legs.

15. The hoof pad according to claim 1, characterized in that the snug fit piece is fixed into at least one of the recesses of the legs by a screw.

16. The hoof pad according to claim 1, characterized in that the snug fit piece comprises with an outer configuration similar to a clover-leaf.

17. The hoof pad according to claim 1, characterized in that at least some of the profile elements define depressions into which a nail can be placed and comprise slot like elevations being defined by an edge.

18. The hoof pad according to claim 17, characterized in that a bottom of at least one of the depressions has a thickness less than the thickness of the pad.

19. The hoof pad according to claim 17, characterized in that a bottom of at least one of the depressions comprises at least one hole for the reception of the nail.

20. The hoof pad according to claim 17, characterized in that the height of said edge corresponds to the height of a head of the nail.

21. The hoof pad according to claim 17, characterized in that the length of the slot like elevation corresponds to substantially twice the length of a head of the nail.

22. The hoof pad according to claim 17, characterized in that said edge is continuous.

23. The hoof pad according to claim 17, characterized in that said slot like elevations are arranged such that during the mounting of the pad on the hoof the elevations are positioned on the white line of the hoof.

24. The hoof pad according to claim 17, characterized in that the slot like elevations are symmetrically arranged on the legs with respect to a longitudinal axis of the hoof pad.

25. The hoof pad according to claim 17, characterized in that said profile elements of said lower surface form naps, said naps being arranged adjacent to said slot like elevations.

26. The hoof pad according to claim 17, characterized in that said naps are arranged distantly with respect to one another and are configured conically.

27. The hoof pad according to claim 1, characterized in that the ends of the legs are convexly curved in the direction of a front end of the hoof pad.

28. The hoof pad according to claim 1, characterized in that said snug fit piece comprises an upper side that is planar with said upper surface of said legs upon insertion of said wings into said recesses of said legs.

* * * * *